United States Patent
Brochhaus

(10) Patent No.: US 10,017,070 B2
(45) Date of Patent: Jul. 10, 2018

(54) METHOD FOR AUTOMATICALLY RECOGNIZING CONTROLLERS IN BATTERY MANAGEMENT SYSTEMS

(71) Applicants: Robert Bosch GmbH, Stuttgart (DE); Samsung SDI Co., Ltd., Yongin-si, Gyeonggi-do (KR)

(72) Inventor: Christoph Brochhaus, Aachen (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 182 days.

(21) Appl. No.: 15/023,080

(22) PCT Filed: Sep. 8, 2014

(86) PCT No.: PCT/EP2014/069026
§ 371 (c)(1),
(2) Date: Mar. 18, 2016

(87) PCT Pub. No.: WO2015/043929
PCT Pub. Date: Apr. 2, 2015

(65) Prior Publication Data
US 2016/0229307 A1  Aug. 11, 2016

(30) Foreign Application Priority Data
Sep. 24, 2013  (DE) ........................ 10 2013 219 105

(51) Int. Cl.
*H02J 7/00* (2006.01)
*B60L 11/18* (2006.01)
(Continued)

(52) U.S. Cl.
CPC ........ *B60L 11/1864* (2013.01); *B60R 16/023* (2013.01); *B60R 16/03* (2013.01); *H02J 7/0047* (2013.01); *G05B 2219/25296* (2013.01)

(58) Field of Classification Search
CPC .. B60L 11/1864; B60R 16/023; H02J 7/0021; H02J 7/0047; H02J 56/60; H02J 2007/0001
(Continued)

(56) References Cited

U.S. PATENT DOCUMENTS

2012/0040216 A1  2/2012  Parakulam
2016/0210478 A1*  7/2016  Brochhaus ............... H04Q 9/00

FOREIGN PATENT DOCUMENTS

DE  43 38 033 A1  5/1995
DE  100 30 987 A1  1/2002
(Continued)

OTHER PUBLICATIONS

International Search Report corresponding to PCT Application No. PCT/EP2014/069026, dated Nov. 17, 2014 (German and English language document) (8 pages).

*Primary Examiner* — Paul Dinh
(74) *Attorney, Agent, or Firm* — Maginot, Moore & Beck LLP

(57) ABSTRACT

A method for automatically detecting a replacement of a control unit in a battery management system including a battery control unit includes allocating a one-way function to each control unit. The one-way function uses x and y to output z. The input y is a sensor_ID that uniquely identifies the control unit concerned. The method further includes providing a random number generated by the battery control unit to the first control unit at every system start-up as input x. The result z from the first control unit is used as the input x for the subsequent one-way function of the subsequent, second control unit until the nth control unit. The result z of the nth control unit is transmitted to the battery control unit.

(Continued)

The method further includes generating a final ID and comparing the final ID with the result z of the nth control unit.

12 Claims, 2 Drawing Sheets

(51) Int. Cl.
*B60R 16/03* (2006.01)
*B60R 16/023* (2006.01)

(58) Field of Classification Search
USPC .......................................... 320/134
See application file for complete search history.

(56) References Cited

FOREIGN PATENT DOCUMENTS

| | | |
|---|---|---|
| DE | 696 32 707 T2 | 7/2005 |
| DE | 10 2005 000 999 A1 | 8/2005 |
| DE | 10 2006 048 555 A1 | 4/2008 |
| EP | 1 118 514 A2 | 7/2001 |

\* cited by examiner

METHOD FOR AUTOMATICALLY RECOGNIZING CONTROLLERS IN BATTERY MANAGEMENT SYSTEMS

This application is a 35 U.S.C. § 371 National Stage Application of PCT/EP2014/069026, filed on Sep. 8, 2014, which claims the benefit of priority to Serial No. DE 10 2013 219 105.7, filed on Sep. 24, 2013 in Germany, the disclosures of which are incorporated herein by reference in their entirety.

BACKGROUND

Electronic control units are being used in increasing numbers in the automobile sector nowadays. They are used in modern motor vehicles as engine control units, control units for the ABS system, for releasing the airbag etc. For electric drive vehicles under development, it is necessary to develop battery packs that have an associated battery management system. The battery management system is a system of control units using software to monitor battery operation. Depending on the requirements of the particular customer or available installation spaces in the motor vehicle, the topologies of battery packs are extremely varied in terms of the number of battery cells, battery modules, sensors or the like.

Typical battery management systems in general ensure safe and reliable operation of the battery cells and battery packs. They monitor and control currents, voltages, temperatures, insulation resistances and other variables for the battery cells and for the entire battery pack. These variables can be used to implement management functions, which can significantly increase the lifetime, reliability and safety of the battery system.

Battery management systems typically comprise a multiplicity of control units, in which run various implemented software functions. The number of battery cells, the number of sensors and the allocation of the battery modules to different installation spaces on the vehicle determine a resultant control unit topology that comprises a battery control unit (BCU) and a number of lower-level sensor control units for acquiring measurement data. The measurement data to be acquired includes in particular voltages, temperatures and currents, which are measured directly at the individual battery modules. The acquired measurement data is generally transferred between the individual control units, i.e. the sensor control units, and the battery control unit via a communications bus, which in particular may be a CAN bus.

DE 10 2006 048 555 A1 discloses a control unit. Said control unit comprises a first integrated circuit, which includes a microcontroller and a programmable memory, and at least one further integrated circuit, which comprises hardcoded identification information. The programmable memory of the first integrated circuit contains checking information, which allows verification of the identification information.

Although identical sensor control units are used in different projects, they are provided with different data depending on the project parameters, and this difference concerns the voltage and current limits, which depend on the power data for the battery cells being used. It must therefore be ensured that sensor control units can be replaced without detection by the battery control unit (BCU) of the battery management system. By installing a new sensor control unit, which is designed for more powerful batteries, the battery may be operated illicitly outside the specification, which would enable, for instance, "tuning" by the end customer. For safety reasons and in particular for warranty reasons, such a replacement must be detected and prevented. On detecting an unauthorized replacement of a control unit, in particular of a sensor control unit, the battery management system can inhibit use of the relevant battery pack in which the replacement has taken place.

SUMMARY

The disclosure proposes a method for detecting a replacement of at least one control unit in a battery system, in which method a one-way function $f(x,y) \rightarrow z$ is defined for all the control units used within the battery management system, which one-way function has the following properties:

The function value z of the one-way function must be easy to calculate, but it must be very complex to invert the function. One-way functions suitable for the method proposed by the disclosure are found in cryptography, for instance as hash functions and a function for multiplying prime numbers and so forth.

The one-way function is implemented in all the control units used in the battery management. The control units in which the one-way functions are implemented are controlled by a battery control unit of the battery management system. The value y in the one-way function is in particular a unique sensor identification (sensor_ID), for example a 32-bit number of the sensor control unit. The parameter y ensures that identical one-way functions give different results in different control units.

According to the method proposed by the disclosure, the control units are initialized once, for example in the factory. This is done by means of each control unit that is used in the battery management system receiving an individual sensor_ID, for instance the 32-bit number already mentioned above, when the battery control unit is first used. Said individual sensor_ID may be a random number, for example. This random number defines the one-way function for the verification to be performed subsequently. This process is understood to mean the initialization of the control units. The sensor_ID, irrespective of whether it is created by the battery control unit determining a random number or specifying a sensor_ID, is permanently stored in the control unit, in particular in the sensor control unit.

In addition, the battery control unit (BCU) of the battery management system stores all the sensor_IDs allocated within a battery pack comprising a plurality of battery cells having a plurality of control units. Thus each of the control units used, in particular each sensor control unit, has its own sensor_ID, and all the control units have different one-way functions, because the parameter y of the one-way function $f(x,y)$ varies from control unit to control unit. The random number, i.e. the sensor_ID, is allocated, for example, on the same communications path as measurement data is later transferred. The communications path may be a vehicle data bus, for example, in particular a CAN data bus in a vehicle.

According to the method proposed by the disclosure, the control units are verified by means of the battery control unit (BCU) of the battery management system generating a random number at every system start-up. The random number is transmitted to the first sensor control unit via the data bus, for example the CAN bus. The random number is here input as an input value to the one-way function of the control unit, wherein the result of the one-way function depends on the sensor_ID of this control unit. The result obtained is transmitted to the second sensor control unit. The calculation is performed here using the one-way function implemented in the second control unit. This procedure of passing the results from one control unit, in particular one sensor control unit, to the next continues until the last control unit, in particular sensor control unit, in the chain sends its result to the battery control unit (BCU) of the battery management system.

All the sensor_IDs are known in the battery control unit (BCU) of the battery management system, and hence all the one-way functions of the individual control units, in particular sensor control units, can be determined in the battery control unit (BCU) of the battery management system. In the battery control unit (BCU), the random number generated initially is input sequentially to all one-way functions. If the ID calculated in the battery control unit (BCU) of the battery management system matches the ID transmitted by the last control unit, in particular by the last sensor control unit, then all the originally installed sensor control units, in particular sensor control units, in the chain are present. If not, a sensor control unit has been replaced.

The method proposed according to the disclosure provides a safeguard against misuse. Specifically, if anyone wishes to replace illicitly a control unit, in particular a sensor control unit, of the battery management system, this person must first know the sensor_ID of the control unit to be replaced and program said sensor_ID into the new control unit, in order to deceive the battery control unit (BCU). This involves programming the entire value range of the sensor_ID one number after another into the new control unit and comparing whether the same one-way function exists in both control units, namely in the old, i.e. removed, control unit and in the new control unit to be installed. Although the method proposed by the disclosure cannot entirely prevent a new control unit to be installed, in particular a new sensor control unit to be installed, being programmed such that it passes the verification during start-up of the battery management system, the selection of the one-way function means that this procedure is extremely complex and proves not worth pursuing.

The method proposed by the disclosure for automatically detecting a replacement of control units in a battery management system can be used in particular to detect if a control unit has been replaced. The initialization in the method proposed by the disclosure, which is performed for every system restart, i.e. each time the battery management system is started up, means that the detection can be performed relatively quickly. To implement the method requires relatively little data traffic for verifying the control units, and moreover the required comparison performed during verification places only a very small load on the battery control unit (BCU) of the battery management system.

The method proposed by the disclosure is characterized by a relatively high level of security against misuse because each of the control units has a different one-way function by virtue of using the sensor_ID as a function parameter. It must also be pointed out that the one-way function cannot be inverted by analyzing the communication. This means that providing a swapped control unit that has the correct ID for deceiving the battery control unit can be practically ruled out.

With the method proposed by the disclosure, there is no delay to the start-up procedure of the battery management system because a comparison of the IDs can be performed in parallel with the rest of the communication, and only a small load is placed on the data bus, in particular on the CAN data bus, of the battery management system.

A simple implementing one-way function is possible using the proposed method. All the sensor control units have the same implementation of the one-way function; it is only the sensor_ID parameter that makes the one-way function for identifying different control units, in particular different sensor control units in the battery pack, unique. The fact that the values calculated by the one-way function are sent from control unit to control unit and are used as input values in the receiving control unit makes it even more difficult to invert the one-way function.

BRIEF DESCRIPTION OF THE DRAWINGS

The disclosure is explained in greater detail below with reference to the drawing, in which.

EMBODIMENT VARIANTS

Figure 1:
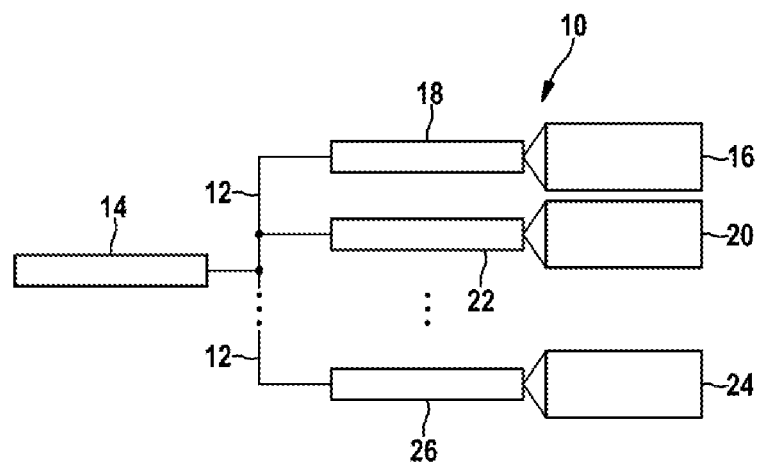
FIG. 1 shows the structure of a battery management system.

FIG. 1 shows a battery management system 10 and its main components. A battery management system 10 according to the schematic diagram of FIG. 1 comprises a data bus 12, which generally in automobile applications is a CAN bus. The battery management system 10 comprises a battery control unit 14 (BCU), which controls a number of sensor control units 18, 22, 26.

The battery control unit 14 (BCU) and a first sensor control unit 18, a second sensor control unit 22 and an nth sensor control unit 26 communicate with one another via the data bus 12. The first sensor control unit 18 controls and/or monitors a first battery module 16, which comprises a number of electrically interconnected battery cells. Similarly, the second sensor control unit 22 controls and/or monitors a second battery module 20, which likewise comprises a number of electrically interconnected battery cells. An nth sensor control unit 26 controls and/or monitors an nth battery module 24, which likewise comprises a number of electrically interconnected battery cells. The 1 to n battery modules 16, 20, 24 shown here constitute a battery pack, which can be used as a traction battery for a hybrid vehicle or for an electric vehicle.

Figure 2:
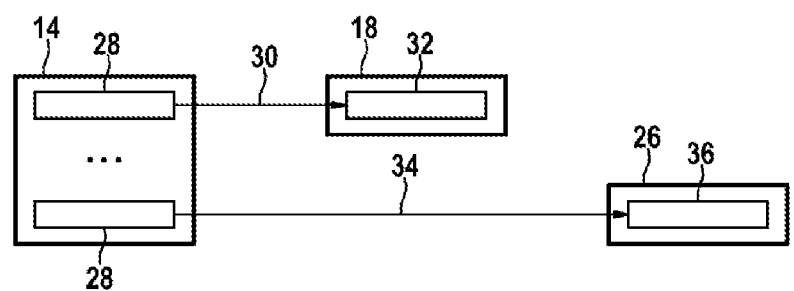
FIG. 2 shows a battery control unit (BCU) of a battery management system initializing control units, in particular sensor control units.

FIG. 2 shows sensor control units 18, 22, 26 of a battery management system, which sensor control units are initialized with initial sensor_IDs by a battery control unit of the battery management system.

FIG. 2 shows that in the battery control unit 14 of the battery management system are provided a plurality of generators 28, which generate the sensor_IDs for the individual sensor control units 18, 26. Preferably n generators 28 are provided here for n sensor control units 18, 22, 26. The battery control unit 14 hence comprises n generators 28, each of which is connected to one sensor control unit 18, 22, 26. A sensor_ID, which is defined for the second sensor control unit 18 and uniquely identifies same, is via a communications connection 30 between the battery control unit 14 and the second sensor control unit 18. The sensor_ID defined for the second sensor control unit 18 is saved in a memory 32 in the second sensor control unit 18, is stored permanently there and cannot be changed.

The generators 28 provided in the battery control unit 14 generate as many sensor_IDs as there are sensor control units 18, 22, 26 installed in the battery pack. The nth generator 28 finally generates the sensor_ID for the nth sensor control unit 26. The sensor_ID for the nth sensor control unit 26 is transmitted to a memory 36 for the sensor_ID of the nth sensor control unit 26 via a communications connection 34 between the nth generator 28 and the nth sensor control unit 26, and permanently stored in the memory 36 of the nth sensor control unit 26. The sensor_ID is a 32-bit number for instance.

The diagram of FIG. 2 shows initializing of the sensor_IDs for the individual sensor control units 18, 22, 26. The sensor_ID individually allocated by the battery control unit 14 to each of the sensor control units 18, 22, 26 defines a one-way function $f(x,y) \to z$. These one-way functions are implemented both in the battery control unit 14 and individually in each of the sensor control unit 18, 22 and 26, which are provided in a number that equals the number of battery modules to be monitored in the battery management system 10.

Figure 3:
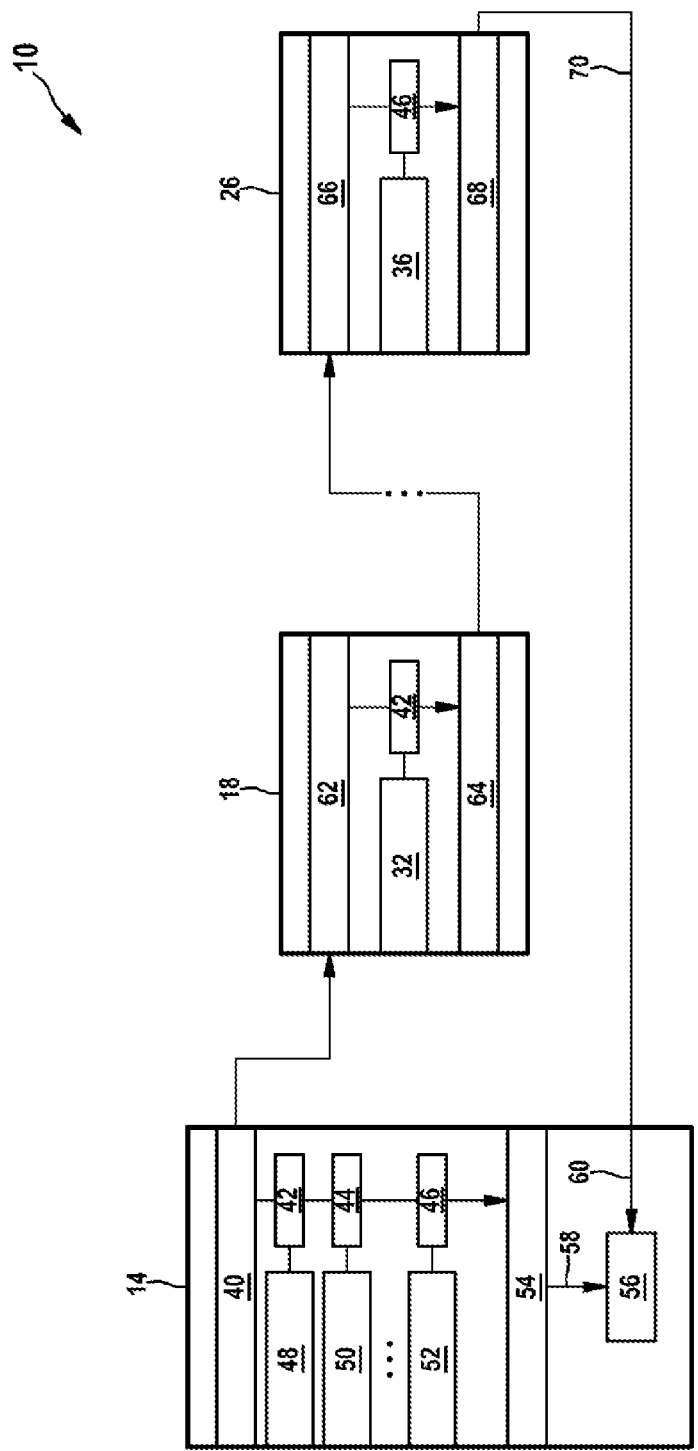
FIG. 3 shows a battery control unit (BCU) of a battery management system performing verification of connected control units, in particular sensor control units.

FIG. 3 shows a verification process which is performed by the method proposed by the disclosure following the initialization according to the method proposed by the disclosure (shown in FIG. 2) for the sensor control units 18, 22, 26.

Based on the diagram of FIG. 2, which shows an initialization process for the sensor control units 18, 22, 26, each of the sensor control units 18, 22, 26 receives an individual sensor_ID, which is a 32-bit number for instance, when the battery control unit 14 is first used. This random number defines the one-way functions $f(x,y) \to z$, which are implemented in the units 42, 44, 46 of the sensor control units 18, 22, 26. The one-way functions are implemented in the units 42, 44, 46 of the sensor control units 18, 22, 26 involved. The variable y in the function $f(x,y) \to z$ constitutes a unique sensor_ID for each control unit 18, 22, 26. The variable y, i.e. the unique sensor_ID, ensures that one-way functions which are identical but implemented in different units 42, 44, 46 of the sensor control units 18, 22, 26, each output different results.

The initialization process shown in FIG. 2 for the individual sensor control units 18, 22, 26 is performed only when a battery pack is first put into operation. The battery control unit 14 generates the sensor_ID for each of the sensor control units 18, 22, 26, and transmits said sensor_ID to the respective sensor control units 18, 22, 26 via the data bus 12, which in particular is in the form of a CAN bus. The sensor_IDs are permanently stored therein and are used as variables for the one-way functions implemented in the units 42, 44, 46 of the respective sensor control units 18, 22, 26. The sensor_IDs are also stored in the battery control unit 14. The initialization process is a one-off process that takes place in a secure environment in the factory. It must be guaranteed that this process is not recorded by unauthorized parties. The initialization process constitutes the sole opportunity to obtain precise information about the individual one-way functions.

The verification shown in FIG. 3 in the battery management 10 of sensor control units 18, 22, 26 connected to the battery control unit 14 is performed at every start-up of the battery management system 10. For this purpose, the battery control unit 14 generates a random number. The random number is generated in at least one generator 40 in the battery control unit 14 (BCU). In addition, the battery control unit 14 comprises memories 48, 50, 52 as shown in the diagram of FIG. 3. The sensor_ID for the first sensor control unit 18 is stored in the first memory 48, whereas the sensor_ID for the second sensor control unit 22 is saved in the second memory 50. Finally, the battery control unit 14 comprises an nth memory 52, in which the sensor_ID for the nth sensor control unit 26 is stored. In addition, all the one-way functions implemented in the units 42, 44, 46 for each of the connected sensor control units 18, 22, 26 are known in the battery control unit 14 of the battery management system 10. Furthermore, the sensor control unit has a computing capacity, which determines a final ID (see item 54), and a comparison stage 56. The operation of the comparison stage 56 is explained further below.

For the purpose of verifying the individual sensor control units 18, 22, 26, the random number generated in the generator 40 is transmitted to an input 62 of the first sensor control unit 18 and to a unit 42, which transforms the variables x and $y_1$ in accordance with the one-way function $(f(x,y_1)=z_1)$. The first sensor control unit 18 receives the random number from the battery control unit 14. This random number constitutes the variable x in the one-way function $(f(x,y_1)=z_1)$ implemented in the first sensor control unit in the unit 42. The sensor_ID transmitted to the first sensor control unit 18 in the initialization process shown in the diagram in FIG. 2 is known in the memory 32 of the first sensor control unit 18 and constitutes the variable $y_1$ in the first sensor control unit 18. The result $z_1$ is calculated from the one-way function $f(x,y_1)=z_1$. This is performed in the calculation stage 64. The calculated result $z_1$ is transmitted from this stage to an input 66 of a subsequent sensor control unit 26.

In FIG. 3, the dotted arrow between the first sensor control unit 18 shown in FIG. 3 and the nth sensor control unit 26 indicates that there may be a multiplicity of sensor control units connected to the battery control unit 14.

The behavior in a further sensor control unit, which is not shown in FIG. 3, would be that this sensor control unit receives the result from the first sensor control unit 18, and calculates from this result, i.e. from the number $z_1$, which constitutes the variable x in the one-way function 44 in the second sensor control unit, from its own sensor_ID, $y_2$ and from the one-way function $f(x(x=z_1, y_2=$sensor_ID of sensor control units 2), the result $z_2$. The result $z_2$ would similarly be sent to a third sensor control unit (likewise not shown in FIG. 3) and processed there. The nth sensor control unit 26 shown in FIG. 3 receives the result from the previous sensor control unit n−1 and calculates from this result z(n−1), which forms the variable x for the nth one-way function 46 of the nth sensor control unit 26 the input value of the sensor_ID $y_N$ for said nth sensor control unit and provides the result $z_N$. The calculation is performed in the calculation stage 68 of the nth sensor control unit 26 as shown in the diagram in FIG. 3.

It is clear from the diagram in FIG. 3 that this result $Z_N$ at the output 70 is sent back to the battery control unit 14, and the result $Z_N$ is sent to a second input 60 of the comparison stage 56.

The same calculations are performed in parallel in the battery control unit 14 (BCU), in parallel with this verification process for the sensor control units 18, 22, 26 connected to the battery control unit 14:

The result $z_1$ is obtained via the unit 42, in which the first one-way function is implemented, from the random number generated in the generator 40 and from the sensor_ID for the first sensor control unit 18. $z_1$ constitutes the x-variable of the subsequent, second one-way function 44 of the second sensor control unit, which calculates the result $z_2$ using the function f (x=$z_1$, sensor_ID for the second sensor control unit=$y_2$). The result $z_2$ from the second sensor control unit in turn constitutes the input value for the subsequent, third sensor control unit, the one-way function of which calculates the result $z_3$ according to the relationship $f(z_2$ sensor_ID for the third sensor control unit $y_3$), and so forth. Finally in the nth sensor control unit, the result $z_N$ is determined according to the relationship $f(n_1$, sensor_ID, $y_N$).

In the comparison stage 56, a comparison is performed from the result $z_N$ fed back via the output 70 from the nth sensor control unit 26, which result is determined in the calculation stage 68 of the nth sensor control unit 26 and is applied to the second input 60 of the battery control unit 14, and from the final ID 54 calculated in the battery control unit 14. If the numbers obtained match, none of the sensor control units 18, 22, 26 have been replaced in the battery management system 10. If, on the other hand, the numbers do not match, then at least one of the sensor control units 18, 22, 26 has been swapped.

In the event that one of the sensor control units 18, 22, 26 has been replaced illicitly, the following response options are available:

The battery control unit 14 inhibits operation of the battery pack comprising the battery modules 16, 20, 24 because not all of the sensor control units 18, 22 and 26 are still in the original state.

In addition, the battery control unit 14 (BCU) can be configured such that in this case it permits only limited operation because not all the sensor control units 18, 22, 26 are still in the original state.

There is also the option for the battery control unit 14 to interrogate individual sensor control units 18, 22 and 26 in the event of an error being detected. For instance the aim of this interrogation may be to query which of the sensor control units 18, 22, 26 is the replaced sensor control unit. The fact that the individual sensor_IDs of the individual sensor control units 18, 22, 26 (in the original state) are stored in the battery control unit 14 means that it is possible to identify the replaced unit amongst the sensor control units 18, 22, 26 by a sequential comparison of the one-way functions, as implemented in the units 42, 44, 46 of the sensor control units 18, 22, 26.

In the case of a faulty sensor control unit 18, 22, 26 being replaced, there is also the option of training the new sensor control unit. This initialization process (see the diagram in FIG. 2 and associated description) as described above should be possible only in a workshop, for instance, and should have special security safeguards, for example secured by an existing encryption technique.

If, however, the battery control unit 14 (BCU) has been replaced, the following response options are available:

A new initialization process can be performed for all the sensor control units (see the diagram in FIG. 2), which process can be secured by an existing encryption technique. The alternative option is to transfer the sensor_IDs stored in the faulty battery control unit 14 to the new battery control unit integrated into the battery management system, provided this transfer can be performed in a secure manner.

The invention claimed is:

1. A method for detecting a replacement of a sensor control unit in a battery management system, the method comprising:
    allocating, with a battery control unit connected to each sensor control unit in a plurality of sensor control units in the battery management system, a one-way function in a plurality of one-way functions to each sensor control unit in the plurality of sensor control units, each one-way function in the plurality of one-way functions using inputs (i) a variable x and (ii) a variable y to output a result z and the input variable y being a sensor_ID that uniquely identifies each sensor control unit in the plurality of sensor control units;
    transmitting, with the battery control unit, a random number generated with a random number generator in the battery control unit to a first sensor control unit in the plurality of sensor control units during a start-up of the battery management system, the random number being input as the variable x to a first one-way function in the plurality of one-way functions of the first sensor control unit, the result z from the one-way function of the first sensor control unit being used as the input variable x for a second one-way function in the plurality of one-way functions of a subsequent, second sensor control unit in the plurality of sensor control units, and determining the result z of at least one subsequent sensor control unit in the plurality of sensor control units until an nth sensor control unit in the plurality of sensor control units, wherein the plurality of sensor control units includes n sensor control units;
    transmitting, with the nth sensor control unit, the result z of the nth sensor control unit to the battery control unit;
    defining, with the battery control unit, the plurality of one-way functions of of the plurality of sensor control units in the battery control unit using the sensor_IDs of the plurality of sensor control units;
    applying, with the battery control unit, the random number generated in the battery control unit to each one-way function in the plurality of one-way functions allocated to the plurality of sensor control units to generate a final ID in the battery control unit;
    detecting, with the battery control unit, a replacement of at least one sensor control unit in the plurality of the sensor control units in response to a comparison of the final ID generated in the battery control unit with the result z of the nth sensor control unit not matching; and
    inhibiting or limiting, with the battery control unit, operation of at least one battery module connected to the battery management system in response to the detecting of the replacement of the at least one sensor control unit.

2. The method as claimed in claim 1, further comprising:
    providing with the battery control unit, an individual sensor_ID to each sensor control unit in the plurality of sensor control units at a time of first use.

3. The method as claimed in claim 1, further comprising:
    storing each sensor_ID allocated to the plurality of sensor control units in a memory of a sensor control unit in the plurality of sensor control units that corresponds to each sensor_ID and storing each sensor_ID in a memory of the battery control unit.

4. The method as claimed in claim 1, further comprising:
    storing, with the battery control unit, each sensor_ID allocated to the plurality of sensor control units in a memory of the battery control unit.

5. The method as claimed in claim 1, wherein the battery control unit allocates each sensor control unit in the plurality of sensor control units with a different one-way function in the plurality of one-way functions by virtue of the sensor_IDs used as the input variable y of each one-way function of each of the sensor control units.

6. The method as claimed in claim 1, the transmitting of the random number further comprising:
    transmitting, with the battery control unit, the random number to the first sensor control unit using a data bus wherein the first sensor control unit also transmits measurement data measured from the at least one battery module to the battery control unit using the data bus.

7. The method as claimed in claim 1, further comprising: applying, with the battery control unit, the random number generated in the battery control unit sequentially to each one-way function in the plurality of one-way functions allocated to the plurality of sensor control units.

8. The method as claimed in claim 1, further comprising: selecting, with the battery control unit, the plurality of one-way functions from a group of cryptographic functions, hash functions and prime-number multiplication functions.

9. The method as claimed in claim 1, further comprising: enabling, with the battery control unit, operation of the at least one battery module in the battery management system in response to determining that each sensor control unit in the plurality of sensor control units is configured in an original state in the battery management system if the final ID determined in the battery control unit matches the output result z transmitted by the nth sensor control unit.

10. The method as claimed in claim 1, wherein the sensor_ID is a 32 bit number.

11. The method as claimed in claim 6, wherein the data bus is a controller area network (CAN) bus.

12. The method as claimed in claim 6, wherein the measurement data are battery-cell voltages, currents and temperature.

* * * * *